999,866. INTERMITTENTLY-ACTING FEEDING DEVICE FOR SOLID MATERIALS. GUSTAF VON POST, Stockholm, Sweden. Filed Oct. 20, 1909. Serial No. 523,574.

*To all whom it may concern:*

Be it known that I, GUSTAF VON POST, a subject of Sweden, residing at 11 Handtverkaregatan, Stockholm, Sweden, have invented new and useful Improvements in Intermittently-Acting Feeding Devices for Solid Materials, of which the following is a specification.

For certain purposes, as is well known, an intermittent feeding of solid bodies from a magazine to the consuming place is required. For such intermittent feeding horizontal, rotating disks, inclined, oscillating disks or reciprocating valves, etc., have been used, but all these means have possessed certain disadvantages. Coals are for instance disintegrated when being fed in this way, whereby their effect is diminished, nor does the feeding take place quite intermittently, and owing to the properties of carbid such intermittent feeding has not proved successful.

The present invention has for its object a device by means of which a reliable intermittent feeding of solid materials from a large receptacle is accomplished.

A form of construction of such a feeding device is illustrated in the accompanying drawing, in which—

Figure 1:
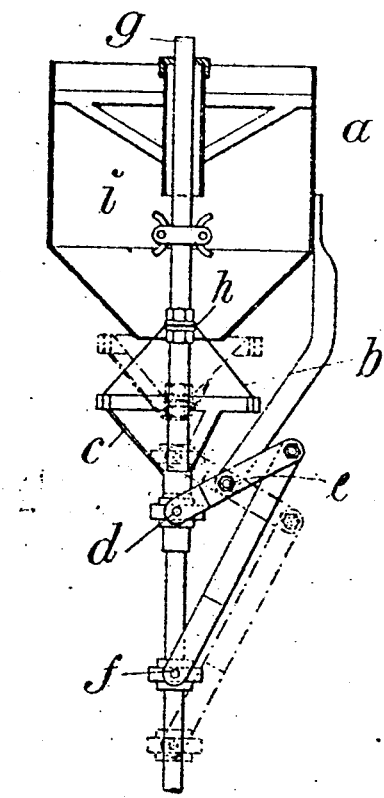
Figure 2:
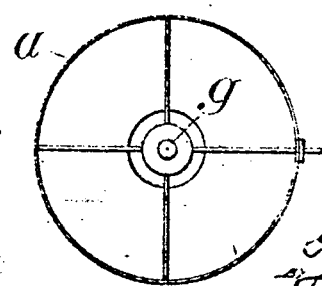

Figure 1 is a longitudinal sectional view and Fig. 2 is a plan view.

The feeding device consists of a vertically reciprocable rod $g$ passing through the receptacle $a$ which holds the material to be intermittently fed down into an underlying consuming chamber. The rod is surrounded by a flexible plate $b$, made of any suitable material such as leather or cloth, which can assume alternately a convex and a concave position with relation to the discharge opening of the receptacle. This can be done by connecting the central part $h$ of the plate to the rod, while its circumference is secured to a part $c$, which may be of annular shape and reciprocable with relation to the rod $g$. The last mentioned movement may be effected for instance by a lever device, consisting of a lever fulcrumed at a fixed point $e$ and having its inner end connected to the part $c$ as at $d$, while its outer end is connected by means of a link, with the rod $g$ at a point $f$ beneath $d$. When the rod $g$ moves upward the part $c$ then will move downward and vice versa.

In moving the rod $g$ upward the central part $h$ of the plate, being connected to the rod, will also move upward, while the peripheral part is pulled downward by the lever mechanism, so that the plate assumes the shape of an erect cone as shown in full lines in Fig. 1, allowing the material which is heaped on the plate to fall off. In moving the rod $g$ downward the central part of the plate will follow, while its peripheral part will be raised to occupy the position shown in dotted lines in Fig. 1, thus allowing some material from the superposed receptacle $a$ to fall down into the hopper formed by the plate.

By making the circumference of the plate movable in opposite direction to the center, it is possible to obtain a sufficient relative movement between these two parts by means of a limited movement of the rod $g$. The quantity of material fed down from the receptacle $a$ at each stroke depends upon the distance through which the rod $g$ moves as well as the speed of movement. The latter may be provided, inside the receptacle, with arms $i$ facilitating the downward movement of the material, if the latter has any tendency to cake together and not to fall down by itself from the receptacle $a$.

I claim—

1. In a feeding device of the character described, in combination, a receptacle adapted to receive the material to be fed and provided with a discharge opening, a flexible plate operatively associated with said opening, and means for causing said plate alternately to assume the position of an inverted cone and an erect cone with relation to said receptacle, in the first of said positions the plate receives the material from the receptacle and in the second of which positions it discharges the material so received.

2. In a feeding device of the character described, in combination, a receptacle adapted to receive the material to be fed and provided with a discharge opening, a reciprocable rod extending within said opening, a flexible plate secured at its central portion to said rod, a reciprocable member to which the outer portion of the plate is secured, and means for causing said reciprocable member to move in the opposite direction to that in which said rod moves.

3. In a feeding device of the character described, in combination, a receptacle adapted to receive the material to be fed and provided with a discharge opening, a reciprocable rod extending within said opening, a flexible plate secured at its central portion to said rod, a reciprocable member slidingly mounted on said rod, and to which the outer portion of the plate is secured, and means connected to said rod and said member for causing the latter to move in the opposite direction to that in which said rod moves.

4. In a feeding device of the character described, in combination, a receptacle adapted to receive the material to be fed and provided with a discharge opening, a reciprocable rod extending within said opening, a flexible plate secured at its central portion to said rod, a reciprocable member to which the outer portion of the plate is secured, a lever having one of its ends operatively connected to said member, said lever being fulcrumed at a point intermediate its ends, and a link operatively connected to the other end of said lever and to said rod.

In testimony whereof I have signed my name to this specification in the presence of two subscribing witnesses.

GUST. von POST.

Witnesses:
H. TELANDER,
BIRGER NORDFELDT.